United States Patent [19]

Amari

[11] Patent Number: 5,101,112
[45] Date of Patent: Mar. 31, 1992

[54] METHOD OF AND APPARATUS FOR MEASURING A VELOCITY VECTOR BY USE OF A SPATIAL FILTER

[75] Inventor: Yasufumi Amari, Mitaka, Japan

[73] Assignee: Secom Co., Ltd., Tokyo, Japan

[21] Appl. No.: 503,013

[22] Filed: Apr. 2, 1990

[30] Foreign Application Priority Data

Apr. 4, 1989 [JP] Japan .................................. 1-083978

[51] Int. Cl.$^5$ ............................................ G01N 21/86
[52] U.S. Cl. ...................................... 250/561; 356/28
[58] Field of Search ......... 250/214 R, 214 RC, 206.1, 250/206.2, 206.3, 561; 356/28, 28.5

[56] References Cited

U.S. PATENT DOCUMENTS

| | | | |
|---|---|---|---|
| 4,725,136 | 2/1988 | McCullough et al. | 356/28 |
| 4,849,620 | 7/1989 | Guerin et al. | 250/206.1 |
| 4,875,769 | 10/1989 | Linebarger | 356/28 |
| 4,921,345 | 5/1990 | Tsuchitani et al. | 356/28 |

Primary Examiner—David C. Nelms
Attorney, Agent, or Firm—Armstrong, Nikaido, Marmelstein, Kubovcik & Murray

[57] ABSTRACT

At least a set of two spatial filters are so arranged in a two-dimensional space or three-dimensional space that their spatial distributions are opposite to each other. Two systems of light detection signals from a moving object are synchronously collected through the spatial filters, integrated, and photoelectrically converted into time-series electrical signals. The electric signals are processed according to a predetermined algorithm. A result of the process is judged as positive or negative to find the direction of a velocity of the object. The magnitude of the velocity is found from the two systems of light detection signals according to a known equation. Instead of oppositely arranging the spatial distributions of the two spatial filters, at least one differential spatial filter system may be employed to provide light detection signals corresponding to those provided by the oppositely arranged spatial filters.

7 Claims, 4 Drawing Sheets

METHOD OF AND APPARATUS FOR MEASURING A VELOCITY VECTOR BY USE OF A SPATIAL FILTER

BACKGROUND OF THE INVENTION

1. Field of the Invention

The present invention relates to a method of and an apparatus for measuring the size and direction of a velocity vector of a relatively moving object or the position of the object by use of a spatial filter.

2. Description of the Prior Art

A spatial filter having a row of slits formed on the surface thereof at a predetermined pitch is employed to detect a frequency of light transmitted through the spatial filter and measure the velocity of a moving object that is emitting the light. When the object to be measured, which may be a two-dimensional pattern or a texture, moves at a velocity of V above the spatial filter having the slits of pitch P, the light from the object transmitted through the spatial filter is collected and photoelectrically converted into electric signals. Supposing a basic frequency of the electric signals is f, the following is established:

$$V = f \cdot P \quad (1)$$

Based on this equation, the velocity V of the object can be found. Namely, when a light spot is moving at a velocity of V behind a grid having a pitch of P, a flickering frequency of the light spot in front of the grid is f. Since the pitch P of the grid is known and the flickering frequency f can be measured by a frequency analyzing method, etc., the velocity V of the light spot may be calculated and measured. This is described in, for example, "Spatial Filter and Its Application (I)," in a journal "Measurement and Control" Vol. 19, No. 4, April, 1980. The velocity measurement by the spatial filter technique employing the spatial filter is simple and sure because it can uniquely determine a velocity according to the equation (1). This is why the technique is widely practiced in the steel and paper industries for measuring velocities of steel plates and sheets, in the real-time measurement of a traveled distance of a marathon runner, in the velocity measurement of a super high-speed plasma-like flying particle, or in the wind velocity measurement in which a temperature distribution is used as a kind of pattern.

The conventional velocity measurement employing the spatial filter is capable of measuring the size of a velocity vector, but however, incapable of measuring the direction of the velocity vector. Namely, the conventional spatial filter technique reacts similarly to a pattern moving from the right to the left in front of a spatial filter grid and to the same pattern moving from the left to the right. Accordingly, it is impossible to measure the direction of the movement of the pattern. It is generally recognized, therefore, that the conventional spatial filter technique is useful only for accurately measuring the size of a velocity vector but useless for measuring the direction of the velocity vector. This problem limits the application of the spatial filter technique, and must be resolved.

SUMMARY OF THE INVENTION

To overcome the above problem, an object of the present invention is to provide a method and an apparatus employing spatial filters for measuring the size and direction of a velocity vector and the position of a moving object in a one-, two-, or three-dimensional space.

According to the present invention, a set of at least two spatial filters are oppositely arranged in a two-dimensional space or in a three-dimensional space. The spatial filters synchronously provide two systems of light signals from a moving object. The light signals are collected, integrated, and photoelectrically converted into time-series electrical signals, which are arithmetically processed according to a certain algorithm. A result of the arithmetic process is judged as positive or negative, to decide the direction of a velocity vector of the moving object. The size of the velocity vector is obtainable from the two systems of light signals according to the equation (1) as in the conventional manner. Instead of oppositely arranging the at least two spatial filters in a space, at least one differential spatial filter system may be arranged in the space to provide light signals that correspond to those provided by the oppositely arranged spatial filters.

In accordance with one aspect of the present invention, there is provided a method of measuring the size and direction of a velocity vector of a moving object. According to the method, two spatial filters having the same spatial distribution are oppositely arranged at spatial positions away from the moving object. A photoelectric sensor is employed to receive two systems of time-series light signals from the moving object through the spatial filters and photoelectrically convert the light signals into two systems of time-series electrical signals. Alternatively, according to the method, a differential spatial filter system comprising photoelectric elements and differential arithmetic circuits is arranged at a spatial position to receive reflective light from the moving object in time series and provide two systems of time-series electric signals, i.e., photoelectrically converted signals and their inverted signals. The size of a velocity vector of the moving object is found according to a basic frequency of one of the two systems of the received light signals. At the same time, the two systems of the photoelectrically converted time-series electric signals are arithmetically processed according to a predetermined direction judging equation, and a peak value of a result of the arithmetic process is judged as positive or negative, thereby measuring the direction of the velocity vector of the moving object.

In accordance with another aspect of the present invention, there is provided an apparatus for directly executing the above-mentioned measuring method. The apparatus comprises at least a set of spatial filter circuits including two oppositely arranged spatial filters and photoelectric converting elements for converting two systems of light signals emitted from a moving object and transmitted through the two spatial filters into time-series electrical signals. The apparatus further comprises storage means for storing the two systems of time-series electric signals provided by the spatial filter circuits; first arithmetic and logic means for finding the size of a velocity vector of the object that is moving relative to the spatial filter circuits according to a basic frequency of one of the two systems of time-series electric signals, and for processing a predetermined direction judging equation according to the two systems of electrical signals; and second arithmetic and logic means for judging whether a peak value of a result of the arithmetic process carried out by the first arithmetic and logic means is positive or negative, thereby deciding the direction of the velocity vector of the moving object.

In accordance with still another aspect of the present invention, there is provided an apparatus for measuring a velocity vector of a moving object. The apparatus comprises at least one differential spatial filter system including photoelectric elements and differential arithmetic circuits to convert light signals into time-series electrical signals and achieve arithmetic and logic functions; inverting circuit means for inverting the time-series electrical signals provided by the differential spatial filter system to provide conjugate electrical signals; first arithmetic and logic means for finding the size of the velocity vector of the object that is moving relative to the differential spatial filter system, according to a basic frequency of the time-series electrical signals or of the conjugate electrical signals, and for processing a predetermined direction judging equation according to both the electrical signals; and second arithmetic and logic means for judging whether a peak value of a result of the process carried out by the first arithmetic and logic means is positive or negative, thereby determining the direction of the velocity vector of the object.

BRIEF DESCRIPTION OF THE DRAWINGS

These and other objects, features and advantages of the present invention will be more apparent from the following detailed description of preferred embodiments in conjunction with the accompanying drawings.

DETAILED DESCRIPTION OF THE EMBODIMENTS

Figure 1:
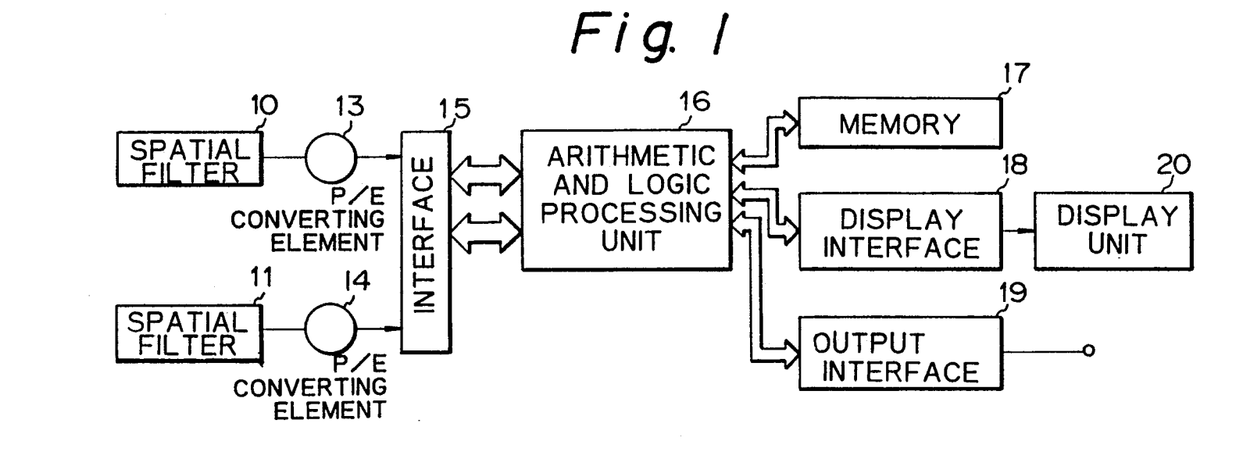
FIG. 1 is a system block diagram showing the relations of basic components of a velocity and position measuring apparatus employing spatial filters according to the present invention.
Figure 2:
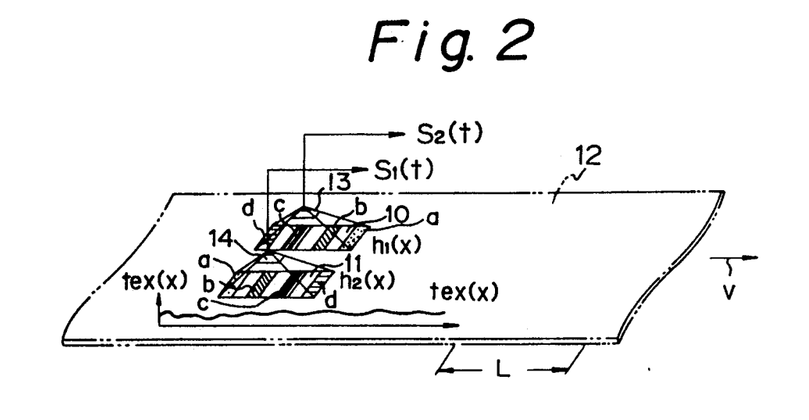
FIG. 2 is a schematic perspective view showing two spatial filters oppositely arranged in a space, and explaining a principle of the present invention.

In FIGS. 1 and 2, a velocity and position measuring apparatus comprises two spatial filters 10 and 11 for measuring the size and direction of a velocity vector oriented in one direction. As shown in FIG. 2, the two spatial filters 10 and 11 are fixedly arranged above an object 12 to be measured. The object 12 is, for example, the surface of the earth having an irregularity or a pattern and moving at a velocity of V. Light such as reflected light from the object 12 is transmitted through both the spatial filters 10 and 11. As shown in FIG. 2, the two spatial filters 10 and 11 are made of the same element but oppositely disposed in a space. Each of the spatial filters 10 and 11 has slits a to d arranged side by side in a moving direction of the object 12, and the slits of the spatial filters 10 and 11 oppositely arranged. Namely, the slits of the spatial filter 10 are arranged in the order of a to d, while the slits of the spatial filter 11 are arranged in the order of d to a.

The spatial filters 10 and 11 are installed on, for example, the bottom of a cart. As the cart moves on the floor, the floor moves relative to the cart, and the size and direction of a velocity vector of the running cart, i.e., the object 12 is measured.

Light from the object 12 is transmitted through the spatial filters 10 and 11 and provides optical information related to a texture pattern of the surface of the floor, i.e., the object 12. The optical information from the filters 10 and 11 is transferred to photoelectric converting elements 13 and 14, which photoelectrically converts the optical information into time-series electrical signals S1(t) and S2(t). The electrical signals S1(t) and S2(t) are transferred to an arithmetic and logic processing unit 16 through an interface 15 at predetermined time-series intervals, as shown in FIG. 1. Thereafter, the time-series electrical signals S1(t) and S2(t) are stored in a RAM of a memory 17 comprising the RAM and a ROM. At the same time, the arithmetic and logic processing unit 16 calculates the size of a velocity vector V of the object 12 according to one of the time-series electric signals S1(t) and S2(t) by using the known spatial filter measurement technique. In addition, the arithmetic and logic processing unit 16 judges the direction of the velocity vector V according to the time-series electrical signals S1(t) and S2(t) by using the following direction judging equation (2):

$$D(f) = a(f/v) \cdot b(f/v) \cdot Im\left[\frac{F\{S_1(t)\}}{F\{S_2(t)\}} - \frac{F\{S_2(t)\}}{F\{S_1(t)\}}\right] \quad (2)$$

In the above equation (2), the "F" represents a Fourier transformation. Supposing the systems of the spatial filters 10 and 11 are h1(x) and h2(x), respectively, the following will be established:

$$F\{h_1(x)\} = H_1(\mu)$$
$$= a(\mu) + jb(\mu)$$

Namely, by judging whether a peak value obtained from the equation (2) is positive or negative, the direction of the velocity vector V can be determined.

According to the equation (2), a peak value of the D(f) is calculated from the time-series electrical signals S1(t) and S2(t) provided at fixed intervals. If the peak value is positive, the direction of the velocity vector V is judged to be positive, and if the peak value is negative, the direction of the velocity vector V is judged to be negative.

The direction judging equation (2) will be considered next. In FIG. 2, spatial convolutions y1(x) and y2(x) of the spatial distributions h1(x) and h2(x) of the two spatial filter systems including the two spatial filters 10 and 11 and a spatial distribution tex(x) of the texture of the relatively moving object 12 will be expressed as follows by ignoring coefficients:

$$y_1(X) = \int_0^L tex(\xi)h_1(x - \xi)d\xi \quad (3)$$

-continued $$y_2(X) = \int_0^L tex(\xi)h_2(x - \xi)d\xi \quad (4)$$

By applying a spatial Fourier transformation on both sides of the above equations, the following is established:

$$Y_1(\mu) = Tex(\mu) \cdot H_1(\mu) \quad (5)$$

$$Y_2(\mu) = Tex(\mu) \cdot H_2(\mu) \quad (6)$$

where the "$\mu$" represents a spatial frequency.

Since the spatial filters 10 and 11 are the same elements which are oppositely arranged, the distribution h2(x) is an inverse of the spatial structure of the distribution h1(x). Therefore, the Fourier-transformed spatial distributions have the following known relation (a correlation theorem):

$$H_2(\mu) = H_1^*(\mu) \quad (7)$$

The mark "*" in the above equation (7) represents a complex conjugate Accordingly, the equation (6) will be expressed as follows:

$$Y_2(\mu) = Tex(\mu) \cdot H_1^*(\mu) \quad (8)$$

By applying an inverse Fourier transformation, the above equation will be expressed as follows:

$$y_2(X) = \int_0^L tex(\xi)h_1(\xi + x)d\xi \quad (9)$$

Comparing the equation (3) with the equation (9), it is understood that the y1 is a convolutional integration of the tex(x) and h1(x), and the y2 is a correlational integration of the tex(x) and h1(x). From the equations (5) and (8), it is understood that, in a spatial frequency region, the Y1($\mu$) is a product of the texture characteristics Tex($\mu$) of the object and the characteristics H1($\mu$) of the spatial filter 10, while the Y2($\mu$) is a product of the texture characteristics Tex($\mu$) of the object and a complex conjugate H1($\mu$) of the characteristics of the spatial filter 10.

Here, it is supposed that the two spatial filters 10 and 11 move at a velocity of V relative to an object having a certain pattern, e.g., a patterned surface. Pattern signals (light signals) transmitted through the two spatial filter systems having the two spatial filters are spatially integrated and photoelectrically converted to provide time-series electrical signals S1(t) and S2(t) as in the preceding case. These signals will be expressed as follows by ignoring coefficients:

$$s_1(t) = y_1(Vt) \quad (10)$$

$$s_2(t) = y_2(Vt) \quad (11)$$

These equations indicate that a structure of the time-series signals obtained by moving the system at a unit velocity is equal to a spatial structure of the patterns transmitted through the spatial filters, and that the time-series signals obtained by moving the spatial filter systems at the velocity V are equal to those obtained by compressing the time-series signals obtainable by moving the filters at the unit velocity, to 1/V in a time axis direction.

The signals S1(t) and S2(t) are subjected to a temporal Fourier transformation to obtain frequency characteristics S1(f) and S2(f), which are expressed as follows by ignoring coefficients:

$$S_1(f) = Y_1(f/v) = Tex(f/v) \cdot H_1(F/V) \quad (12)$$

$$S_2(f) = Y_2(f/v) = Tex(f/v) \cdot H_1^*(F/V) \quad (13)$$

These equations indicate that the frequency characteristics of time-series signals obtainable by moving the spatial filter systems at a unit velocity are identical to the spatial frequency characteristics of a pattern transmitted through the spatial filters, and that the frequency characteristics of time-series signals obtainable by moving the systems at the velocity V are equal to those obtainable by expanding the frequency characteristics of the systems moving at the unit velocity by V times in a frequency axis direction.

The above explanation is applicable for the spatial filter systems having the two spatial filters 10 and 11 moving at the velocity V.

In other words, moving the spatial filter systems at the velocity V relative to the object texture 12 is equal to compressing the spatial structures of the object texture 12 and spatial filters to 1/V and making the relative velocity thereof be the unit velocity.

Taking such an equality into account, light transmitted through the two spatial filter systems h1(x) and h2(x) moving at the velocity V is spatially integrated and photoelectrically converted to provide two time-series electric signals S1(t) and S2(t), from which the direction of the velocity vector V can be judged. This will be explained next.

The signals S1(t) and S2(t) are subjected to the Fourier transformation, and their proportion will be expressed as follows:

$$\frac{F\{S_1(t)\}}{F\{S_2(t)\}} = \frac{S_1(f)}{S_2(f)} = \frac{Y_1(f/v)}{Y_1(f/v)} \quad (14)$$

$$= \frac{Tex(f/v) \cdot H_1(f/v)}{Tex(f/v) \cdot H_2(f/v)} = \frac{H_1(f/v)}{H_2(f/v)}$$

$$\therefore \frac{F\{S_1(t)\}}{F\{S_2(t)\}} = \frac{H_1(f/v)}{H_1^*(f/v)}$$

This is because $$H_2(f/v) = H_1^*(f/v)$$

Similarly, the following is established:

$$\frac{F\{S_2(t)\}}{F\{S_1(t)\}} = \frac{H_1^*(f/v)}{H_1(f/v)} \quad (15)$$

Supposing $$H_1(\mu) = a(f/v) + jb(f/v)$$

in other words $$H_1(f/v) = a(f/v) + jb(f/v)$$

then the following is obtained:

$$\frac{F\{S_1(t)\}}{F\{S_2(t)\}} = \frac{a^2 - b^2}{a^2 + b^2} + j\frac{2ab}{a^2 + b^2} \quad (16)$$

$$\frac{F\{S_2(t)\}}{F\{S_1(t)\}} = \frac{a^2 - b^2}{a^2 + b^2} - j\frac{2ab}{a^2 + b^2} \quad (17)$$

By calculating the equation (16) minus the equation (17), and the equation (17) minus the equation (16), the following is obtained:

$$\frac{F\{S_1(t)\}}{F\{S_2(t)\}} - \frac{F\{S_2(t)\}}{F\{S_1(t)\}} = 0 + j\left(\frac{4ab}{(a^2 + b^2)}\right) \quad (18)$$

$$\frac{F\{S_2(t)\}}{F\{S_1(t)\}} - \frac{F\{S_1(t)\}}{F\{S_2(t)\}} = 0 - j\left(\frac{4ab}{(a^2 + b^2)}\right) \quad (19)$$

Taking the imaginary number portions of both sides of the equations (18) and (19) into account, the both sides are multiplied by $(a^2+b^2)/4ab$ to obtain the following:

$$\frac{a^2(f/v) + b^2(f/v)}{4a(f/v)b(f/v)} \cdot Im\left[\frac{F\{S_1(t)\}}{F\{S_2(t)\}} - \frac{F\{S_2(t)\}}{F\{S_1(t)\}}\right] = +1 > 0 \quad (20)$$

$$\frac{a^2(f/v) + b^2(f/v)}{4a(f/v)b(f/v)} \cdot Im\left[\frac{F\{S_2(t)\}}{F\{S_1(t)\}} - \frac{F\{S_1(t)\}}{F\{S_2(t)\}}\right] = -1 < 0 \quad (21)$$

The left side of the equation (20) correctly corresponds to the right side of the equation (2) because $(a^2+b^2)/4ab$ is positive. Here, the fact that the spatial filters 10 and 11 expressed by the characteristic representations h1(x) and h2(x) are oppositely arranged in a space is very important. Namely, if the moving direction is positive, the left side of the equation (20) will be positive. When the moving direction changes to negative, the roles of the signals S1(t) and S2(t) are inverted because the characteristic representations h1(x) and h2(x) are opposite to each other. Accordingly, the left side of the equation (20) shifts to the left side of the equation (21) to become negative. By making a positive or negative judgment of the equation (20), i.e., the equation (2), in the arithmetic and logic processing unit 16 shown in FIG. 1, the direction of the velocity vector V can be decided.

Naturally, the size of the velocity vector V is measurable according to the known spatial filter technique by the arithmetic and logic processing unit 16.

Figure 3:
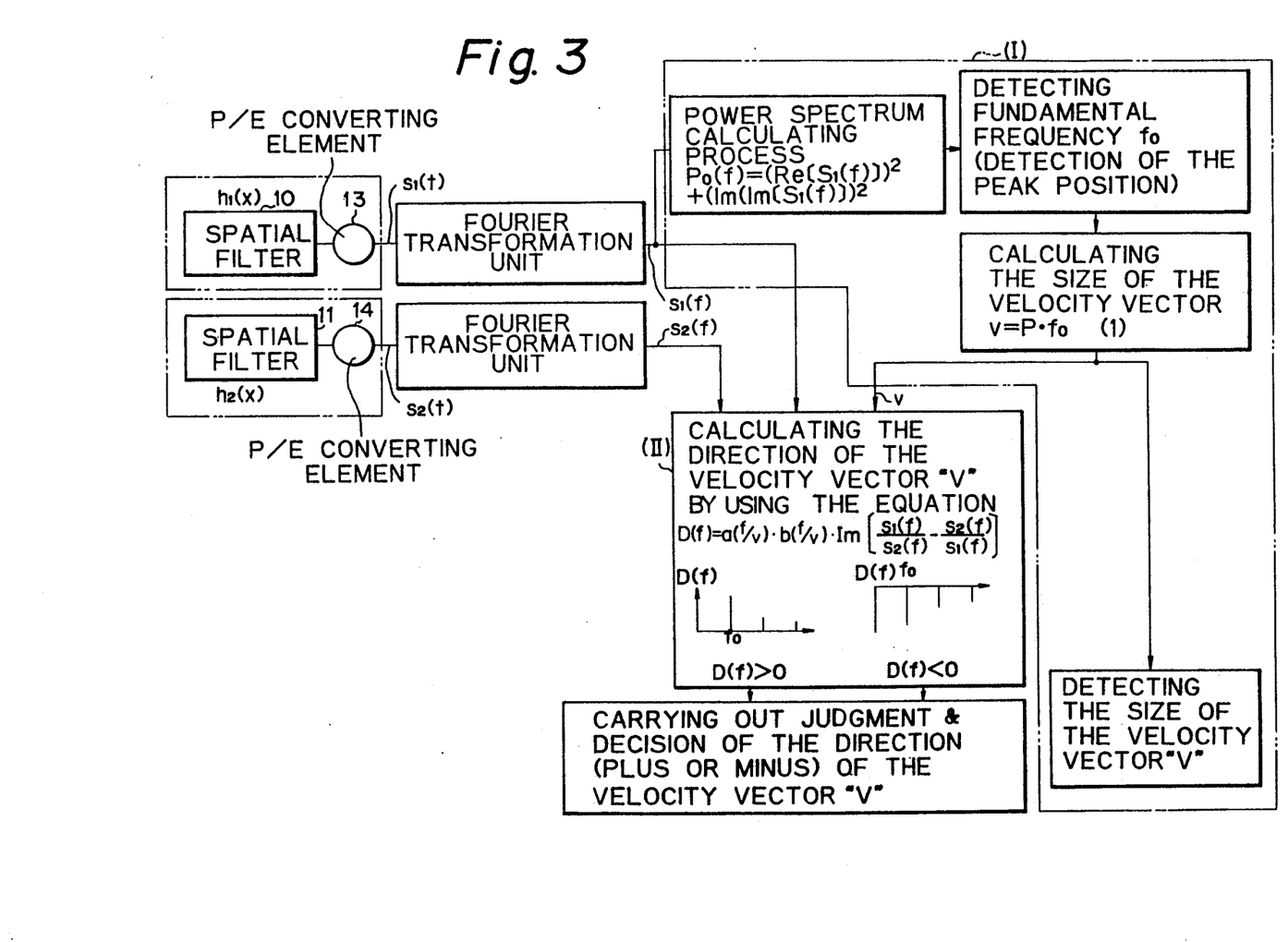
FIG. 3 is a block diagram explaining an arithmetic and logic processing algorithm executed in an arithmetic and logic unit of FIG. 1.

FIG. 3 is a block diagram showing an algorithm executed in the arithmetic and logic processing unit 16 of FIG. 1 to find the size and direction of a velocity vector V. The calculation of the size of the velocity vector V is carried out according to the equation (1) in the arithmetic and logic processing unit 16 (FIG. 1) by use of the algorithm (I), while the calculation and judgment of the direction of the velocity vector V is carried out by use of the algorithm (II). Respective detection portions detect the size of the velocity vector V and carry out the judgment and decision of the direction of the velocity vector V.

Referring again to FIG. 1, after the size and direction of the velocity vector V are detected, judged and decided, the results may be displayed on a display unit 20 through a display interface 18, or transferred outside through an output interface 19. In the above explanation, a principle of the present invention for judging and deciding the size and direction of the velocity vector V has been explained. Next, an embodiment of a measuring apparatus employing the two spatial filters 10 and 11 for measuring a velocity vector will be explained.

Figure 4:
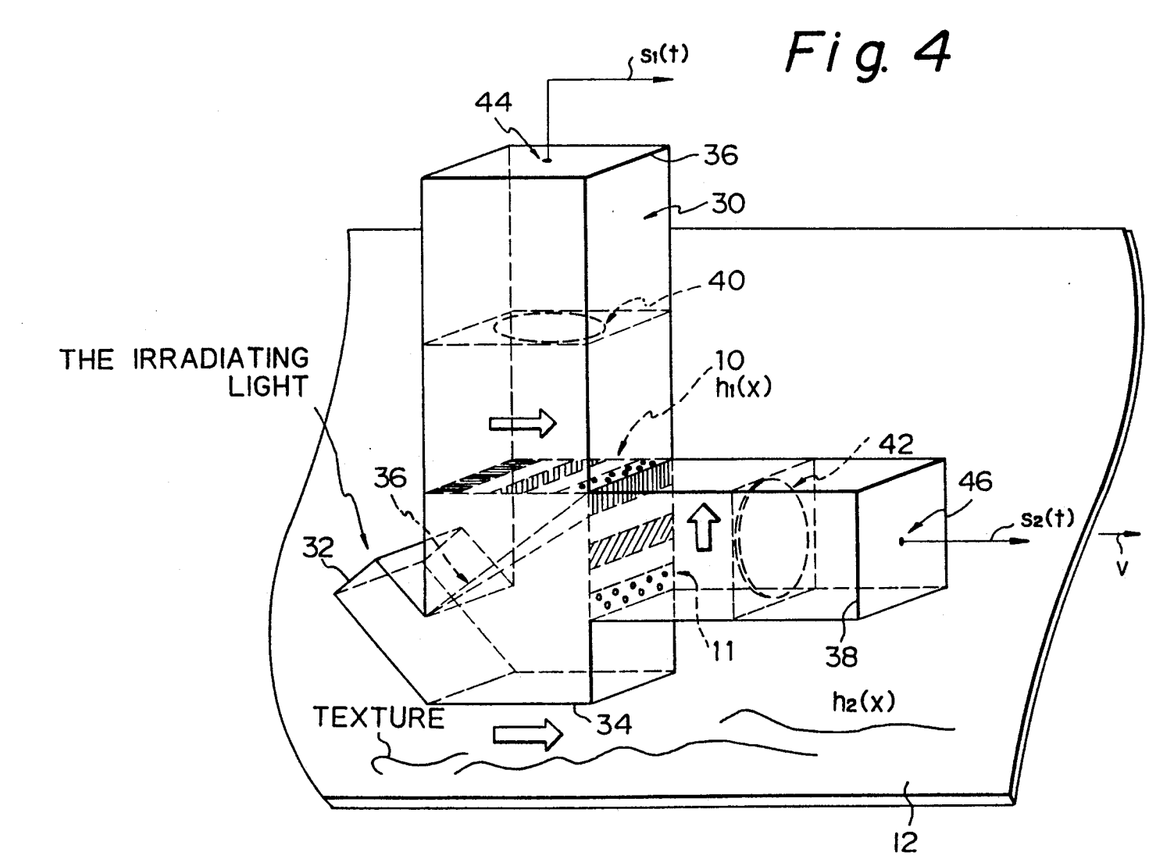
FIG. 4 is a perspective view showing the essential part of a velocity and position measuring apparatus employing spatial filters according to an embodiment of the present invention.

FIG. 4 is a view showing the essential part of a velocity vector measuring apparatus employing the spatial filters according to the embodiment of the present invention. A casing 30 is movable relative to an object 12 whose surface has a pattern or a texture. There will be three moving states, i.e., only the casing 30 moves, only the object 12 moves, and both of them move. An end of the casing 30 has a light emitting opening 32. Light from the opening 32 irradiates the surface texture of the object 12, and reflection of the light from the object 12 enters the casing 30 through a light signal input opening 34 formed at a lower end of the casing 30. The light signal thus entered the casing 30 is a representative of the surface texture of the object 12, and is equally divided into two by a half mirror 36. Inside the casing 30, two spatial filters 10 and 11 are disposed orthogonally to each other. The equally divided light signals are transmitted through the spatial filters 10 and 11, respectively. The spatial filters 10 and 11 provide the same functions as those provided by the oppositely arranged spatial filters of FIG. 2.

The spatial distribution characteristics of the spatial filters 10 and 11 are expressed by h1(x) and h2(x), and the light signals transmitted through the spatial filters 10 and 11 are passed through image forming lenses 40 and 42 to form images on photoelectric elements 44 and 46 disposed at end portions 36 and 38 of the casing 30. Namely, the light signals filtered by slits of the spatial filters 10 and 11 are collected by the image forming lenses 40 and 42 and subjected to integrating actions on the photoelectric elements 44 and 46 disposed at the end portions 36 and 38. The light signals on the photoelectric elements 44 and 46 are converted into electrical signals by the photoelectric elements 44 and 46. Since the light signals are provided in time series, the electric signals are also time-series electrical signals S1(t) and S2(t), which are transmitted outside from the photoelectric elements 44 and 46. The time-series signals S1(t) and S2(t) thus obtained are transferred to an arithmetic and logic processing unit such as the arithmetic and logic processing unit 16 of FIG. 1, where the signals are processed according to the algorithms (I) and (II) of FIG. 3, thereby providing measurements of the size and direction of the velocity vector V.

Figure 5:
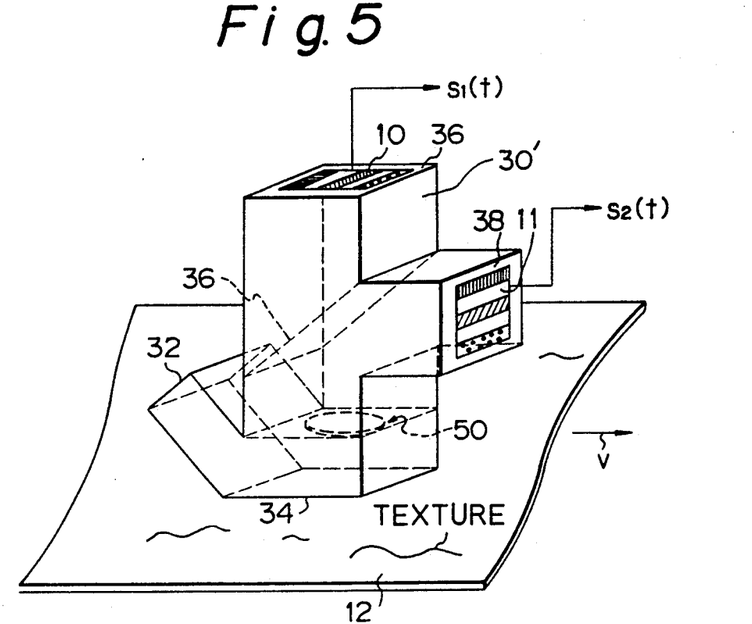
FIG. 5 is a perspective view showing the essential part of a velocity and position measuring apparatus employing spatial filters according to another embodiment of the present invention.

FIG. 5 is a view showing the essential part of a velocity vector measuring apparatus according to another embodiment of the present invention.

This embodiment comprises a casing 30' which is substantially identical to the casing 30 of the previous embodiment.

What is different about this embodiment from the preceding one is that a single image forming lens 50 is disposed in the casing 30' in the vicinity of a light signal input opening 34. The image forming lens 50 collects light, and a half mirror 36 that is identical to that of the previous embodiment divides the light into two equivalent light signals. The light signals are sent toward spatial filters 10 and 11 including photoelectric converting elements at two end portions 36 and 38 of the casing 30'. Since the spatial filters 10 and 11 themselves serve to provide photoelectrical converting functions, the light signals transferred to the spatial filters 10 and 11 are converted into time-series electrical signals S1(t) and S2(t). In this arrangement also, the spatial filters 10 and 11 are arranged at the end portions 36 and 38 of the casing 30' that are orthogonal to each other, so that the spatial filters 10 and 11 demonstrate equivalent actions as those of the oppositely arranged spatial filters. The size of a velocity vector V can be measured according to a basic frequency of one of the time-series signals S1(t) and S2(t) provided by the spatial filters 10 and 11 disposed at the end portions of the casing 30', and the direction of the velocity vector V can be judged from both the signals.

Figure 6:
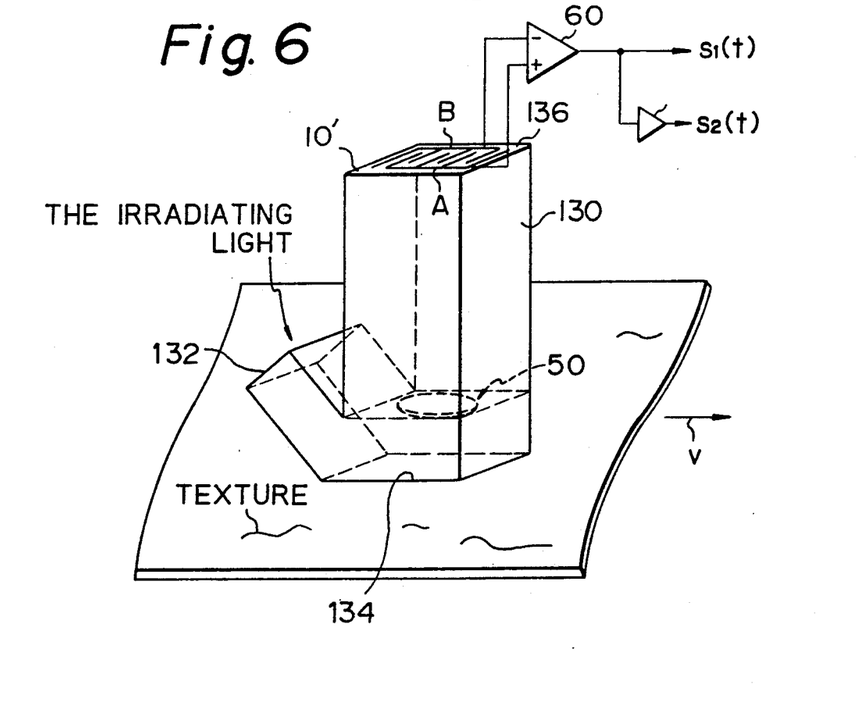
FIG. 6 is a perspective view showing the essential part of a measuring apparatus employing a differential spatial filter according to still another embodiment of the present invention.

FIG. 6 is a view showing a velocity vector measuring apparatus employing a differential spatial filter 10' according to another embodiment of the present invention.

In this embodiment, a casing 130 has a light introducing opening 132 for irradiating a surface texture of an object 12. Reflection of the light from the texture of the object 12 enters the casing 130 through a light signal opening 134. The reflection, i.e., a light signal, is collected by an image forming lens 50, and forms an image on the differential spatial filter 10' disposed at an end portion 136 of the casing 130. The differential spatial filter 10' has two sets of sensor array groups A and B of known differential arrangement. Each of the sensor array groups involves a plurality of slits arranged at a pitch of P, and the slits of both the sensor array groups are separated from one another by a pitch of ½ P. The sensor array groups A and B provide time-series electrical signals according to the light signal representing the characteristics of the texture of the object 12. The time-series electrical signals are applied to a differential amplifier 60, which provides a differentially amplified output Sl(t) based on both the electrical signals. The output Sl(t) is a single peak spatial frequency signal. At the same time, the output S1(t) is inverted by an inverting amplifier 62 to provide an inverted signal S2(t). As a result, two time-series electrical signals are obtained similar to the previous two embodiments. According to the two signals S1(t) and S2(t), the size and direction of a velocity vector V can be judged and decided.

In the embodiments explained above, a velocity vector V of the linearly moving flat object 12 has been measured for its size and direction. By arranging a plurality of the spatial filter sets, the size and direction of a two-dimensionally or three-dimensionally oriented velocity vector may be measured, and by collecting such measurements, the velocity of an object moving in a three-dimensional space may be measured.

The present invention is, therefore, able to measure the velocity of a cart or robot traveling on the floor, and control and measure the velocities of various products such as cloths, sheets, metal plates, resin boards, resin films, textile, magnetic tapes, cables, optical fibers, and printed matter. The present invention is also applicable for measuring the movements of a human, blood corpuscles, and microorganisms in a medical field, the traveling speed of an artificial satellite, airplane, and ship. Since the direction of a velocity vector is measurable, the position of a moving object may be detected by integrating measured velocities.

As is apparent from the above explanation, a method of and apparatus for measuring a velocity vector with the use of spatial filter according to the present invention enable the measurement of the direction of a velocity vector, which was impossible by conventional spatial filters. Since the present invention can measure a true amount of a velocity vector, i.e., the size and direction of the velocity vector, the invention is applicable for a wide range of industrial fields. Also for a conventional velocity detector employing differential spatial filters, a principal of the present invention is applicable to arithmetically process signals sampled by the conventional detector. Therefore, the present invention can revive the conventional detector without changing a measuring probe of the detector to measure a true velocity vector, i.e., the size and direction of the velocity vector. Since no change is made in a basic arrangement of the spatial filters, a low cost velocity vector measuring apparatus is provided.

I claim:

1. A method of measuring, with the use of spatial filters, the size and direction of a velocity vector of an object that is moving relative to the spatial filters, comprising the steps of:

transmitting two systems of light signals from the relatively moving object through two spatial filters which have the same spatial distribution and are oppositely arranged relative to each other along the movement of the object at spatial positions away from the object;

receiving the light signals in time series by photoelectric sensors;

providing two systems of time-series photoelectrically converted electrical signals based on the light signals;

measuring a velocity of the object according to a basic frequency of one of the two systems of time-series electrical signals;

arithmetically processing the two systems of time-series electrical signals according to a predetermined direction judging equation; and judging whether a peak value of a result of the arithmetic process is positive or negative, thereby measuring the direction of the velocity of the relatively moving object.

2. A method of measuring, with the use of a differential spatial filter system, the size and direction of a velocity vector of an object that is moving relative to the differential spatial filter system, comprising the steps of:

arranging said differential spatial filter system at spatial positions away from the relatively moving object;

receiving light signals from the relatively moving object in time series;

obtaining two systems of time-series electrical signals including signals photoelectrically converted from the light signals, and inverted signals determined by subjecting the photoelectrically converted signals to electrical inversion;

measuring a velocity of the moving object according to a basic frequency of one of the two systems of time-series electrical signals;

arithmetically processing the two systems of time-series electrical signals according to a predetermined direction judging equation; and judging whether a peak value of a result of the arithmetic process is positive or negative, thereby measuring the direction of the velocity of the relatively moving object.

3. An apparatus for measuring, with the use of spatial filters, the size and direction of a velocity vector of an object that is moving relative to the spatial filters, comprising:

at least a set of spatial filter circuits including two spatial filters having identical but oppositely arranged spatial distributions, and photoelectrically converting elements for converting two systems of light signals transmitted from the object through said two spatial filters into two systems of time-series electrical signals;

storage means for storing the two systems of time-series electrical signals provided by said spatial filter circuits;

first arithmetic and logic means for finding the size of a velocity of the object according to a basic frequency of one of the two systems of time-series electrical signals read out of said storage means, and processing a predetermined direction judging equation according to the two systems of electric signals; and second arithmetic and logic means for judging whether a peak value of a result of the process carried out by s id first arithmetic and logic means is positive or negative, thereby judging the direction of the velocity of the object.

4. The measuring apparatus according to claim 3, wherein said first and second arithmetic and logic means comprises a single arithmetic and logic processing unit.

5. The measuring apparatus according to claim 3, further comprising a half mirror for synchronously dividing a light signal from the object into two, which are supplied to said spatial filters of said spatial filter circuits, respectively.

6. An apparatus for measuring, with the use of a differential spatial filter system, the size and direction of a velocity vector of an object that is moving relative to the differential spatial filter system, comprising:

at least two differential spatial filter means opposingly arranged with each other, each said spatial filter means including photoelectric elements and differential arithmetic circuits, and each said differential spatial filter means being for converting light signals into time-series electrical signals and for arithmetic processing;

inverting circuit means for inverting the time-series electrical signals from at least one of said differential spatial filter means to provide conjugate electrical signals of the time-series electrical signals;

first arithmetic and logic means for finding the size of a velocity of the object according to a basic frequency of the time-series electrical signals or of the conjugate electrical signals, and for processing a predetermined direction judging equation according to both the electrical signals; and second arithmetic and logic means for judging whether a peak value of a result of the process carried out by said first arithmetic and logic means to decide the direction of the velocity of the object.

7. The measuring apparatus according to claim 6, wherein the first and second arithmetic and logic means comprise a single arithmetic and logic processing unit.

* * * * *